Patented Aug. 23, 1949

2,479,884

UNITED STATES PATENT OFFICE 2,479,884

PROCESS OF REACTIVATING A POISONED SILVER SURFACE CATALYST

Theo John West, Port Arthur, Tex., and James P. West, Chicago, Ill., assignors to Allied Chemical & Dye Corporation, a corporation of New York No Drawing. Application June 11, 1946, Serial No. 676,114

14 Claims. (Cl. 252—415)

This invention relates to the activation of catalysts used in processes of making olefin oxides by the direct catalytic oxidation of olefins.

Processes for oxidizing olefins directly to olefin oxides by means of oxygen in the presence of silver surface catalysts are well-known. It is also known that the treatment of such catalysts with a halogen compound increases the selectivity (i. e., such treated silver surface catalysts result in the formation of greater proportions of olefin oxides), but depresses the activity of the catalyst for extended periods of time.

Among the objects of this invention is to provide a convenient and economical method for activating silver surface catalysts including such catalysts which have been poisoned in use, for example, due to deleterious constituents such as sulfur compounds and higher hydrocarbons introduced into contact with the catalysts by the olefin oxygen stream passed thereover. Another object is to provide a process for activating silver surface catalysts which process can be applied to the catalyst while in the catalyst converter, i. e., it is not necessary to remove the catalyst from the converter to activate it, but the activation may be carried out without disturbing the catalyst in the converter. Other objects and advantages of this invention will be apparent from the following description thereof.

Silver surface catalysts are activated, according to the present discovery, by a treatment which involves first passing thereover a halogen and then ammonia, to restore the catalyst activity and efficiency. The second step of the reactivation may be effected by passing a stream of ammonia gas over the catalyst. The presence of oxygen in the ammonia gas has a beneficial effect in the removal of some poisons, for example, heavy hydrocarbons. Thus the second step of the process of this invention may be carried out in the presence or in the absence of oxygen. Conveniently, the source of oxygen, if used, is air containing nitrogen as a natural diluent; the ammonia may be added to the air or other oxygen stream used to effect oxidation of the olefin and passed over the catalyst while the flow of the olefin is interrupted, or the ammonia may be added to the olefin-oxygen stream and the ammonia treatment carried out in the presence of the olefin and the oxidation reaction products. This process, it has been found, increases the activity and selectivity of the catalyst, requiring substantially less time so to do than an activation treatment in which an ammonia or an ammonia-oxygen stream, without the preceding halogen-treatment step, is employed.

The halogens which may be employed in the first step of the activation are chlorine, bromine, iodine or fluorine; chlorine is preferred. Moreover, the use of vapors of halogen containing substances is preferred to the use of the halogens themselves because the halogens are extremely reactive with silver, and when used as such the silver halides formed are not distributed uniformly throughout the catalyst bed. By using a halogen containing organic substance, more even distribution of the silver halide throughout the catalyst bed results. Halogen containing organic compounds which may be used are those which under the conditions prevailing in the catalyst converter react with the silver catalyst to form silver halides. Examples of these compounds are ethylene dichloride, methylene chloride, methyl chloride, ethyl chloride, or corresponding compounds of the other halogens, bromine, iodine and fluorine. Of these, ethylene dichloride is preferred.

Conveniently, the halogen compound is added to the ethylene, oxygen, nitrogen stream passed over the catalyst and thus introduced into contact with the catalyst. The amount of halogen compound added to the reactant gas stream will vary, depending on the nature of the silver catalyst treated, particularly the extent to which it has been poisoned. In general, the preferred quantity of halogen is about $10^{-5}$ mol halogen per gram of silver. The rate of flow of the halogen compound over the catalyst and the time of treatment will, of course, vary, depending upon the nature of the catalyst treated, the size of the catalyst converter, etc. When the halogen compound is added to the reactant gases, its rate of flow will, of course, be the same as that of these gases.

The amount of ammonia added to the gas stream may vary within wide limits; from about 1 to about 6 mol percent is preferred. Employing air to supply the oxygen, the ammonia may be incorporated into the air stream by passing the air through an ammonium hydroxide solution prior to passing the air over the catalyst or by adding anhydrous ammonia to the air in the desired proportion. Water vapor introduced into the ammonia, oxygen nitrogen stream by passage of the oxygen nitrogen stream through an ammonium hydroxide solution has a beneficial effect in that it moderates the reaction between the oxygen, ammonia on the one hand, and the catalyst poisons and silver on the other, and also between oxygen and ammonia, and results in more uniform activation of the mass or body of catalyst.

The activation treatment is preferably carried out under the pressure and temperature conditions prevailing in the converter. These conditions are desirably maintained during both steps of the process. Silver surface catalysts, used in catalyzing the ethylene to ethylene oxide reaction and made by depositing silver oxide on an Alundum support, which catalysts are herein-after described in greater detail in connection with the examples, should be reactivated at a temperature not exceeding about 325° C., for example, at a temperature of from 170° to 325° C., preferably within the range of from about 260° to 280° C. More thermally stable silver surface catalysts may be reactivated at higher temperatures.

The amount of oxygen, if used, containing ammonia passed over the catalyst in the second step of the process, the rate of feed thereof and the time of treatment will vary depending upon the nature of the catalyst treated, the size of the catalyst converter, etc. In general, this step should be continued with a sufficient volume of ammonia or oxygen and ammonia until the activity of the catalyst has been restored. This can readily be determined by testing a sample of the catalyst which has been activated by the process of this invention to determine its activity. As above indicated, the second step of the process may be conveniently carried out by simply adding the ammonia to the air or other oxygen stream employed to support oxidation of the olefin, with or without interrupting the flow of the olefin over the catalyst and without removing the body of the catalyst from the converter.

This invention has been found particularly effective for the activation of silver surface catalysts which have become poisoned, for example, due to sulfur, heavy hydrocarbons including lubricating oil constituents or nitric acid, being brought into contact with the catalyst. While the reason for the improvement in the activation of the silver surface catalysts thus poisoned by this invention is not positively known, it is believed the halogen or halogen compound reacts with the poisons to condition them so that upon further reaction with the ammonia and oxygen in the second step of the process, those materials which tend to poison the catalyst form compounds which are volatile or otherwise removable from the catalyst, and in the continued flow of the ammonia or ammonia oxygen stream over the catalyst such removal is effected. The oxygen, if present, has a beneficial effect in the removal of some poisons, such, for example, as heavy hydrocarbons. It is further believed that reaction takes place between portions of the silver surface, which portions have previously been attacked by the halogen, and the ammonia or ammonia and oxygen, to form new catalyst contact points, thereby activating these portions. Although there is good reason to believe the activation proceeds according to the theory set forth above, it is understood this invention is not to be limited by any statements of theory or explanation. The invention consists of the combination of steps of first contacting the catalyst with the halogen or halogen compound, and thereafter passing an ammonia or ammonia oxygen stream thereover to activate the catalyst.

Water vapor may be added to the ammonia oxygen stream employed to effect the reactivation. The larger the concentration of the ammonia in the gas stream employed to effect the reactivation, the larger the quantity of water vapor which should be added to this gas stream. Preferably, about 6 mols of water vapor are added per mol ammonia in the activating gas stream. The addition of water vapor to the ammonia oxygen stream used to effect activation, it has been found, results in uniform activation of the catalyst throughout the whole bed. The water vapor moderates the reaction between the ammonia and oxygen on the one hand, and the poisons, impurities and silver surface on the other, preventing overheating of the inlet end of the catalyst bed and resulting in more uniform activation of the catalyst throughout the whole length and cross-sectional area of the bed. Furthermore, ammonia itself is oxidized over the catalyst in the presence of oxygen. The presence of water vapor moderates this reaction and causes the ammonia and oxygen to more effectively activate the catalyst. The use of water vapor is particularly desirable when activating relatively long catalyst beds maintained in tubes of relatively large diameter in which heat transfer from the catalyst to the temperature control medium is not readily accomplished.

Activation, according to this invention, may be applied to all forms of silver surface catalysts used for catalyzing the oxidation of olefin to olefin oxides, particularly ethylene to ethylene oxide. Silver surface catalysts, which are desirably maintained on catalyst supports such as silica, fused alumina refractory materials, and zirconium oxide, including, but without limitation, Tabular Corundum, Alusite, and Alundum, crushed and screened to a convenient size, may be activated by the process of the invention. The activation procedure may be applied to silver surface catalysts which have been promoted, for example, by the incorporation therein of the oxides, hydroxides or peroxides of barium, lithium or strontium, or by the addition of promotive metals such as gold or copper. It may be applied to the activation of silver surface catalysts produced by co-precipitating silver oxide and silver halides, such as silver chloride, bromide, iodide or fluoride, the latter constituent acting as a promoter, and reducing the co-precipitated silver compounds with ammonia at an elevated temperature, the subject of our copending application Serial No. 676,116 filed June 11, 1946, now U. S. Patent No. 2,463,228, issued March 1, 1949.

Such co-precipitated silver surface catalysts should contain from .03 to .3 percent silver halide by weight of silver oxide, when the silver compounds are co-precipitated, for optimum results.

In use, the silver oxide catalysts are reduced to silver in the presence of the normal reacting gases, e. g. ethylene and oxygen. This reduction of the catalysts employed to catalyze the oxidation of ethylene to ethylene oxide desirably is accomplished during the initial stages of the operation of the catalyst converter, i. e. the "breaking-in" period when the catalyst bed is maintained at about 200° C. for several hours before heating the catalyst to the optimum running temperature.

In the examples which follow, the catalyst used was prepared by taking desired amounts of carrier (the particular carrier used is given in the description of the example), ground silver oxide, and sufficient water to form a thick slurry with the silver oxide and stirring the mixture until the carrier was well-coated with the silver oxide. The wet catalyst was then dried in an oven at about 85° C.

The supported catalyst was placed in a jacketed converter surrounded by boiling heat transfer medium consisting of a mixture of diphenyl and diphenyl oxide.

The technique followed was to flow a mixture of oxygen, ethylene and inert gas (nitrogen) over the catalyst in the converter in the proportions and at the space velocity indicated in connection with each example. The average temperature of the catalyst during the runs is indicated in the tables which follow. Samples of the reaction products were taken and analyzed to determine their ethylene oxide and carbon dioxide content; from these values the percent attack, percent efficiency and percent conversion given in the tables were calculated. In the tables which follow, the figures under the column heading "Time Hours" represent the number of hours, after the commencement of the example in question, at which reaction products were sampled and analyzed as hereinabove described.

By "space velocity" as used herein, is meant the volumes of total gas (at standard conditions of 0.° C. and 760 mm. of mercury pressure) passed over the body of catalyst per hour per volume of catalyst body. By "percent attack" is meant the mols of ethylene converted to carbon dioxide and ethylene oxide × 100, divided by the mols of ethylene passed over the catalyst. By "percent conversion" is meant percent ethylene converted to ethylene oxide per pass through the converter. By "percent efficiency" is meant the number of mols of ethylene converted to ethylene oxide × 100, divided by the number of mols of ethylene converted to ethylene oxide and carbon dioxide. The term "activation" is used in a broad sense and includes reactivation of catalysts which have partially or completely lost their activity.

In the examples, unless otherwise indicated, the percent values are volume percents.

EXAMPLE 1

The catalyst used in this example consisted of one part silver oxide, containing .11% (by weight) silver chloride with respect to the silver oxide and 8 parts Alundum. The catalyst was prepared by co-precipitating the silver oxide and silver chloride by treatment of silver nitrate with barium hydroxide containing an amount of sodium chloride to produce the desired amount of silver chloride relative to the silver oxide, washing the co-precipitated silver compounds with water to remove impurities and then forming a paste with water, intimately mixing the paste with the carrier and drying. The supported catalyst was reduced, before use, by passage thereover of an air stream containing 6 mol percent ammonia and 6 mol percent water vapor for 17 hours at 200° C.

A gas mixture containing 20% oxygen, between 2.2 and 2.3 percent ethylene and the rest nitrogen, was passed over the catalyst at a space velocity of 870.

Table I

| Run | Average Catalyst T., °C. | Time, Hours | Percent Attack | Percent Efficiency | Percent Conversion |
|---|---|---|---|---|---|
| 1 | 261 | 6 | 84.8 | 51.2 | 43.4 |
| 2 | 260 | 30 | 77.4 | 50.3 | 38.9 |
| 3 | 260 | 92 | 73.3 | 51.5 | 37.7 |
| 4 | 260 | 114 | 77.0 | 52.0 | 40.0 |
| 5 | 260 | 155 | 79.3 | 49.0 | 38.8 |
| 6 | 260 | 176 | 53.6 | 64.8 | 34.7 |
| 7 | 260 | 277 | 86.9 | 52.2 | 45.4 |
| 8 | 260 | 353 | 87.4 | 49.4 | 43.2 |

Between runs 1 and 2, 37 volumes of amyl mercaptan per million volumes of oxygen, nitrogen and ethylene were introduced into the oxygen nitrogen ethylene stream passed over the catalyst, and the flow of this mixture over the catalyst continued for 37 minutes. It will be noted from the data on run 2 that this treatment resulted in a partial poisoning of the catalyst in that it reduced the percent attack from 84.8 to 73.3 and the percent conversion from 43.4 to 37.7.

Between runs 3 and 4, an oxygen nitrogen stream containing 6 mol percent ammonia and 6 mol percent water vapor was passed over the catalysts for a period of two hours.

Between runs 5 and 6, .05 mol percent ethylene dichloride was introduced into the ethylene oxygen nitrogen stream passing over the catalyst, and the flow of the resultant gas mixture over the catalyst continued for 5 minutes; thereafter, the flow of ethylene was interrupted and an oxygen, nitrogen stream containing 6 mol percent ammonia and 6 mol percent water vapor passed over the catalyst for two hours.

From the data on runs 7 and 8, it will be evident that the above described treatment activated the catalyst.

EXAMPLE 2

This example demonstrates the effectiveness of the activation procedure of this invention to activate a catalyst which has been poisoned by contact with nitric acid vapors.

In this example, the catalyst used was made by depositing one part (by weight) of silver oxide on 8 parts of Alusite. A mixture containing 20% oxygen, between 2.1% and 2.3% ethylene and the rest nitrogen was passed over the catalyst at a space velocity of 870.

Table II

| Run | Average Catalyst T., °C. | Time, Hours | Percent Attack | Percent Efficiency | Percent Conversion |
|---|---|---|---|---|---|
| 1 | 261 | 27 | 58.6 | 41.2 | 24.2 |
| 2 | 261 | 30 | 21.4 | 37.6 | 8.0 |
| 3 | 260 | 47 | 27.2 | 49.3 | 13.4 |
| 4 | 259 | 75 | 45.5 | 47.3 | 21.5 |
| 5 | 261 | 117 | 48.7 | 55.1 | 26.8 |
| 6 | 260 | 144 | 51.4 | 52.7 | 27.1 |
| 7 | 261 | 169 | 52.7 | 63.8 | 33.6 |
| 8 | 259 | 188 | 66.9 | 61.0 | 40.8 |
| 9 | 258 | 264 | 72.0 | 54.6 | 39.3 |

Between runs 1 and 2, 6 mol percent nitric acid vapor was added to the stream of ethylene, oxygen and nitrogen and this mixture passed over the catalyst for 15 minutes. This treatment, it will be noted, resulted in poisoning of the catalyst in that it reduced the percent attack from 58.6 to 21.4, the percent efficiency from 41.2 to 37.6 and the percent conversion from 24.2 to 8.

Between runs 3 and 4, 6 mol percent ammonia was added to the oxygen nitrogen stream and the resultant stream passed over the catalyst for 45 minutes, the flow of ethylene being interrupted during this period.

Between runs 6 and 7, .05 mol percent ethylene dichloride was added to the oxygen nitrogen stream and this gas mixture passed over the catalyst for 5 minutes. Thereafter 6 mol percent of ammonia was added to the oxygen nitrogen stream passing over the catalyst, the flow of ethylene being interrupted, the resultant gas stream passed over the catalyst for one hour, and immediately thereafter the flow of ethylene was resumed.

Between runs 7 and 8 the ammonia treatment was repeated, 6 mol percent ammonia being added to the oxygen nitrogen stream, this stream passed over the catalyst for 45 minutes, the flow of ethylene being interrupted, and its flow resumed at the end of this 45-minute period.

It will be noted that the activation treatment above described served to completely restore the activity of the catalyst which had been poisoned by the nitric acid treatment; the percent attack after the activation treatment was 66.9 as compared with a percent attack of 58.6 before the treatment with nitric acid and 21.4 after the nitric acid treatment, the percent efficiency was 61 as compared with 41.2 and 37.6 before and after the nitric acid treatment, and the percent conversion 40.8 as compared with 24.2 and 8.0 before and after the nitric acid treatment.

EXAMPLE 3

This example demonstrates the effectiveness of the activation procedure of this invention to activate catalysts which have been poisoned by lubricating oil.

The catalyst used in this example was made by depositing one part (by weight) of silver oxide on eight parts of 8 to 10 mesh Alundum. A mixture containing 20% oxygen, from 2% to 2.3% ethylene and the rest nitrogen was passed over the catalyst at a space velocity of 870.

Table III

| Run | Average Catalyst T., °C. | Time, Hours | Percent Attack | Percent Efficiency | Percent Conversion |
|-----|--------------------------|-------------|----------------|--------------------|--------------------|
| 1   | 262 | 11  | 59.4 | 54.4 | 32.3 |
| 2   | 262 | 19  | 51.7 | 62.7 | 32.3 |
| 3   | 262 | 48  | 53.2 | 60.4 | 32.1 |
| 4   | 262 | 66  | 51.8 | 53.5 | 27.7 |
| 5   | 261 | 156 | 50.8 | 61.1 | 31.0 |
| 6   | 262 | 241 | 43.7 | 55.1 | 24.1 |
| 7   | 261 | 304 | 48.2 | 50.9 | 24.5 |
| 8   | 262 | 375 | 33.5 | 42.7 | 14.3 |
| 9   | 262 | 396 | 30.1 | 46.5 | 14.0 |
| 10  | 262 | 495 | 40.5 | 39.2 | 15.9 |
| 11  | 262 | 501 | 24.0 | 61.6 | 14.8 |
| 12  | 261 | 541 | 43.9 | 65.6 | 28.8 |
| 13  | 262 | 561 | 41.1 | 55.4 | 22.8 |
| 14  | 262 | 637 | 53.8 | 47.0 | 25.2 |
| 15  | 262 | 681 | 54.8 | 48.8 | 26.5 |

Between runs 1 and 2, the ethylene oxygen nitrogen stream was passed through SAE-30 lubricating oil maintained at 100° C. During runs 2 to 8, inclusive, the oxygen nitrogen ethylene stream continued to flow through the lubricating oil prior to passing over the catalyst, thus introducing oil vapor into contact with the catalyst. It will be noted that as a result of this oil vapor brought into contact with the catalyst, the percent attack decreased from 59.4 to 33.5, percent efficiency from 54.4 to 42.7 and the percent conversion from 32.3 to 14.3. The flow of the ethylene oxygen stream through the oil was discontinued one hour after the completion of run 8, and the flow of ethylene, oxygen and nitrogen over the catalyst continued for 20 hours, at which point the reaction products were analyzed and the data given in the above table under run 9 calculated from the analysis. From the data on run 9 in the above table, it is evident the catalyst remained in a partially poisoned condition.

Between runs 9 and 10, 6 mol percent ammonia and 6 mol percent water vapor were added to the oxygen nitrogen stream, the flow of ethylene being interrupted, and the resultant oxygen, nitrogen, water vapor stream passed over the catalyst for two hours.

Between runs 10 and 11, .05 mol percent ethylene dichloride was added to the ethylene oxygen nitrogen stream and the resultant mixture passed for 5 minutes over the catalyst. The flow of ethylene was then interrupted, and 6 mol percent ammonia and 6 mol percent water vapor added to the oxygen, nitrogen stream and the resultant gas mixture passed over the catalyst for two hours.

From the above table, it will be noted that the reactivation procedure of this invention reactivated the catalyst which had been poisoned by lubricating oil.

EXAMPLE 4

The catalyst used in this example was made by depositing one part (by weight) of silver oxide on 8 parts of 8 to 10 mesh Alundum. A gas mixture containing 20% oxygen, from 2.6% to 2.7% ethylene and the rest nitrogen was passed over the catalyst at a space velocity of 870.

Table IV

| Run | Average Catalyst T., °C. | Time, Hours | Percent Attack | Percent Efficiency | Percent Conversion |
|-----|--------------------------|-------------|----------------|--------------------|--------------------|
| 1   | 261 | 75  | 63.5 | 36.5 | 23.0 |
| 2   | 259 | 102 | No Attack | | |
| 3   | 260 | 105 | 59.6 | 55.4 | 33.0 |
| 4   | 260 | 123 | 66.0 | 64.4 | 42.5 |

Between runs 1 and 2, .05 mol percent ethylene dichloride was added to the ethylene oxygen nitrogen stream passed over the catalyst and the flow of the resultant gas stream over the catalyst continued for 5 minutes. The ethylene dichloride was added to the ethylene oxygen nitrogen stream approximately 100 hours after the commencement of run 1. After 2 hours of further operation, no attack was obtained.

The catalyst was then treated by passing thereover for one hour an oxygen nitrogen stream containing 6 mol percent ammonia and 6 mol percent water vapor and immediately thereafter the flow of ethylene was resumed. Two hours after this treatment, the catalyst, it will be noted from the data in the above table, gave an attack of 59.6%, an efficiency of 55.4% and a percent conversion of 33. In the next 18 hours of operation the attack increased to 66% with an efficiency of 64.4% and a percent conversion of 42.5.

In the above Example 4, it will be noted a period of only 2 hours after the passage of the ammonia oxygen stream over the catalyst which had been treated with ethylene dichloride was required before the catalyst showed substantial recovery of its activity and efficiency.

In Example 2, 2½ hours after the flow of the oxygen nitrogen stream over the catalyst which had previously been treated with ethylene dichloride, an attack of 52.7% with an efficiency of 63.8% was obtained. It will, therefore, be noted that the period of treatment required in accordance with the process of this invention to activate the catalyst is relatively short. The more rapid recovery of the catalyst obtained with the process of this invention greatly reduces the period of shut-down required for the activation of the catalyst, and thus increases the capacity of the plant. Moreover, the method of activation of this invention results in an improvement in the activity and selectivity of the catalyst.

The expression "oxidation of olefins to olefin oxides" is used in the specification and claims to include the oxidation of a single olefin, e. g., ethylene to ethylene oxide, as well as the oxidation of a mixture of olefins.

Since certain changes may be made in carrying out the above process without departing from the scope of the invention, it is intended that all matter contained in the above description shall be interpreted as illustrative and not in a limiting sense.

What is claimed is:

1. The method of reactivating a poisoned silver surface catalyst employed in the oxidation of ethylene to ethylene oxide which comprises flowing ethylene dichloride over the body of the catalyst in the converter at a temperature of from 260° to 280° C. and thereafter flowing an air-ammonia stream over the body of the catalyst at a temperature of from 260° to 280° C., said air-ammonia treatment being continued until the activity of the catalyst has been restored.

2. The process of reactivating a poisoned silver surface catalyst employed to catalyze the oxidation of olefins to olefin oxides, which comprises first passing a halogen over said catalyst at a temperature of from 170° to 325° C., and thereafter passing ammonia over said catalyst at a temperature of from 170° to 325° C.

3. The process of reactivating a poisoned silver surface catalyst as defined in claim 2, in which the temperature of the catalyst during the passage of the halogen and ammonia thereover is within the range of from 260° to 280° C.

4. The process of reactivating a poisoned silver surface catalyst employed to catalyze the oxidation of olefins to olefin oxides, which comprises first passing a halogen over the catalyst at a temperature of from 170° to 325° C., and thereafter passing ammonia and water vapor over the catalyst at a temperature of from 170° to 325° C.

5. The process of reactivating a poisoned silver surface catalyst employed to catalyze the oxidation of olefins to olefin oxides, which comprises first passing a halogen over the catalyst at a temperature of from 170° to 325° C., and thereafter passing a stream of oxygen, ammonia and water vapor over said catalyst at a temperature of from 170° to 325° C.

6. The process of reactivating a poisoned silver surface catalyst as defined in claim 5, in which the stream of oxygen, ammonia and water vapor contains about 6 mols of water vapor per mol of ammonia and the temperature of the catalyst during the passage of the halogen and of the stream of oxygen, ammonia and water vapor is within the range of from 260° to 280° C.

7. The method of reactivating a poisoned silver surface catalyst employed to catalyze the oxidation of olefins to olefin oxides, which comprises first passing ethylene dichloride over the catalyst at a temperature of from 170° to 325° C., and thereafter passing ammonia over said catalyst at a temperature of from 170° to 325° C.

8. The method of reactivating a poisoned silver surface catalyst employed to catalyze the oxidation of ethylene to ethylene oxide, which comprises first passing ethylene dichloride over the catalyst at a temperature of from 170° to 325° C., and thereafter passing ammonia and water vapor over the catalyst at a temperature of from 170° to 325° C.

9. The process of reactivating a poisoned silver surface catalyst employed to catalyze the oxidation of olefins to olefin oxides, which comprises first passing a member of the group consisting of halogens, alkyl halides and alkylene halides over said catalyst at a temperature of from 170° to 325° C., and thereafter passing ammonia over said catalyst at a temperature of from 170° to 325° C.

10. The process of reactivating a poisoned silver surface catalyst as defined in claim 9, in which the temperature of the catalyst is within the range of from 260° to 280° C. during the passage of the said member thereover and also during the passage of the ammonia thereover.

11. The process of reactivating a poisoned silver surface catalyst employed to catalyze the oxidation of olefins to olefin oxides, which comprises first passing a member of the group consisting of halogens, alkyl halides and alkylene halides over said catalyst at a temperature of from 170° to 325° C. and thereafter passing a stream of ammonia and water vapor over said catalyst at a temperature of from 170° to 325° C.

12. The process of reactivating a poisoned silver surface catalyst as defined in claim 11, in which the temperature of the catalyst is within the range of from 260° to 280° C. during the passage of the said member thereover and also during the passage of the ammonia and water vapor thereover.

13. The process of reactivating a poisoned silver surface catalyst employed to catalyze the oxidation of olefins to olefin oxides, which comprises first passing a member of the group consisting of halogens, alkyl halides and alkylene halides over said catalyst at a temperature of from 170° to 325° C. and thereafter passing a stream of oxygen, ammonia and water vapor over said catalyst at a temperature of from 170° to 325° C.

14. The process of reactivating a poisoned silver surface catalyst as defined in claim 13, in which the stream of oxygen, ammonia and water vapor contains about 6 mols of water vapor per mol of ammonia and the temperature of the catalyst is within the range of from 260° to 280° C. during the passage of the said member thereover and also during the passage of the stream of oxygen, ammonia and water vapor thereover.

THEO JOHN WEST.
JAMES P. WEST.

REFERENCES CITED

The following references are of record in the file of this patent:

UNITED STATES PATENTS

| Number | Name | Date |
| --- | --- | --- |
| 1,848,723 | Jaeger | Mar. 8, 1932 |
| 2,194,602 | Law | Mar. 26, 1940 |

FOREIGN PATENTS

| Number | Country | Date |
| --- | --- | --- |
| 397,161 | Great Britain | Aug. 3, 1933 |